(12) United States Patent
Saalfeld et al.

(10) Patent No.: US 11,405,361 B1
(45) Date of Patent: Aug. 2, 2022

(54) SECURING CONNECTIONS WITH EDGE DEVICES THAT ARE INCAPABLE OF ENCRYPTED TRANSPORT LAYER CONNECTIONS

(71) Applicant: Amazon Technologies, Inc., Seattle, WA (US)

(72) Inventors: Christoph Saalfeld, Seattle, WA (US); Eeshan Shreeram Thakar, Seattle, WA (US); Alexandra Elizabeth Baoboe Lee, Seattle, WA (US); Jared Sharfin, Seattle, WA (US); Jason Miguel Loo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 16/904,470

(22) Filed: Jun. 17, 2020

(51) Int. Cl.
*H04L 9/40* (2022.01)

(52) U.S. Cl.
CPC .......... *H04L 63/0272* (2013.01); *H04L 63/04* (2013.01); *H04L 63/08* (2013.01); *H04L 63/102* (2013.01); *H04L 63/166* (2013.01)

(58) Field of Classification Search
CPC ..... H04L 63/0272; H04L 63/08; H04L 63/04; H04L 63/166; H04L 63/102

USPC ............................................................ 726/4
See application file for complete search history.

(56) References Cited

U.S. PATENT DOCUMENTS

| 9,198,117 | B2 | 11/2015 | Raleigh | |
| 9,615,192 | B2 | 4/2017 | Raleigh | |
| 11,050,763 | B1 * | 6/2021 | Lyle | H04L 63/0861 |
| 11,245,577 | B2 * | 2/2022 | Behm | H04L 41/085 |

\* cited by examiner

*Primary Examiner* — Benjamin A Kaplan
(74) *Attorney, Agent, or Firm* — Robert C. Kowert; Kowert, Hood, Munyon, Rankin & Goetzel, P.C.

(57) ABSTRACT

An IoT service of a provider network may secure connections with IoT devices that are incapable of encrypted transport layer connections. The IoT service may expose a private endpoint of the IoT service into an isolated virtual network of a client. The provider network may provide a private pathway for traffic between the private endpoint and the isolated virtual network. The IoT service may receive, at the private endpoint from a remote edge device of the client, a request to connect to the IoT service. In response, the IoT network may determine that the request was received from the isolated virtual network of the client. In response to determining that he request was received from the isolated virtual network of the client, the IoT service may authenticate the private endpoint and establish a connection with the remote edge device.

20 Claims, 7 Drawing Sheets

SECURING CONNECTIONS WITH EDGE DEVICES THAT ARE INCAPABLE OF ENCRYPTED TRANSPORT LAYER CONNECTIONS

BACKGROUND

The Internet of Things (IoT) is a phrase given for the interconnection of computing devices scattered around the globe within the existing internet infrastructure. Clients of a remote service provider may leverage the internet-based connectivity of IoT devices by using a service offered by the service provider. For example, a temperature sensor installed at a client site may transmit collected data to the service provider for analysis, receive commands from a back-end system of the service provider, and download software updates from the service provider.

IoT devices are made with various hardware components and therefore different IoT devices may have different capabilities. For example, a more powerful IoT device may be capable of establishing an encrypted transport layer connections (e.g., using transport layer security (TLS)). If a particular service offered by a remote service provider requires a secure TLS connection, then the device can connect to that service (e.g., based on TLS authentication) to begin securely sending data to and receiving data from the service. However, many types of IoT devices are less powerful (e.g., with low complexity and cost-efficient micro-controllers) and do not possess the capability to cryptographically secure their network communication. Therefore, many types of IoT devices that lack the ability to establish encrypted transport layer connections are unable to be used with such a service.

Figure 1:
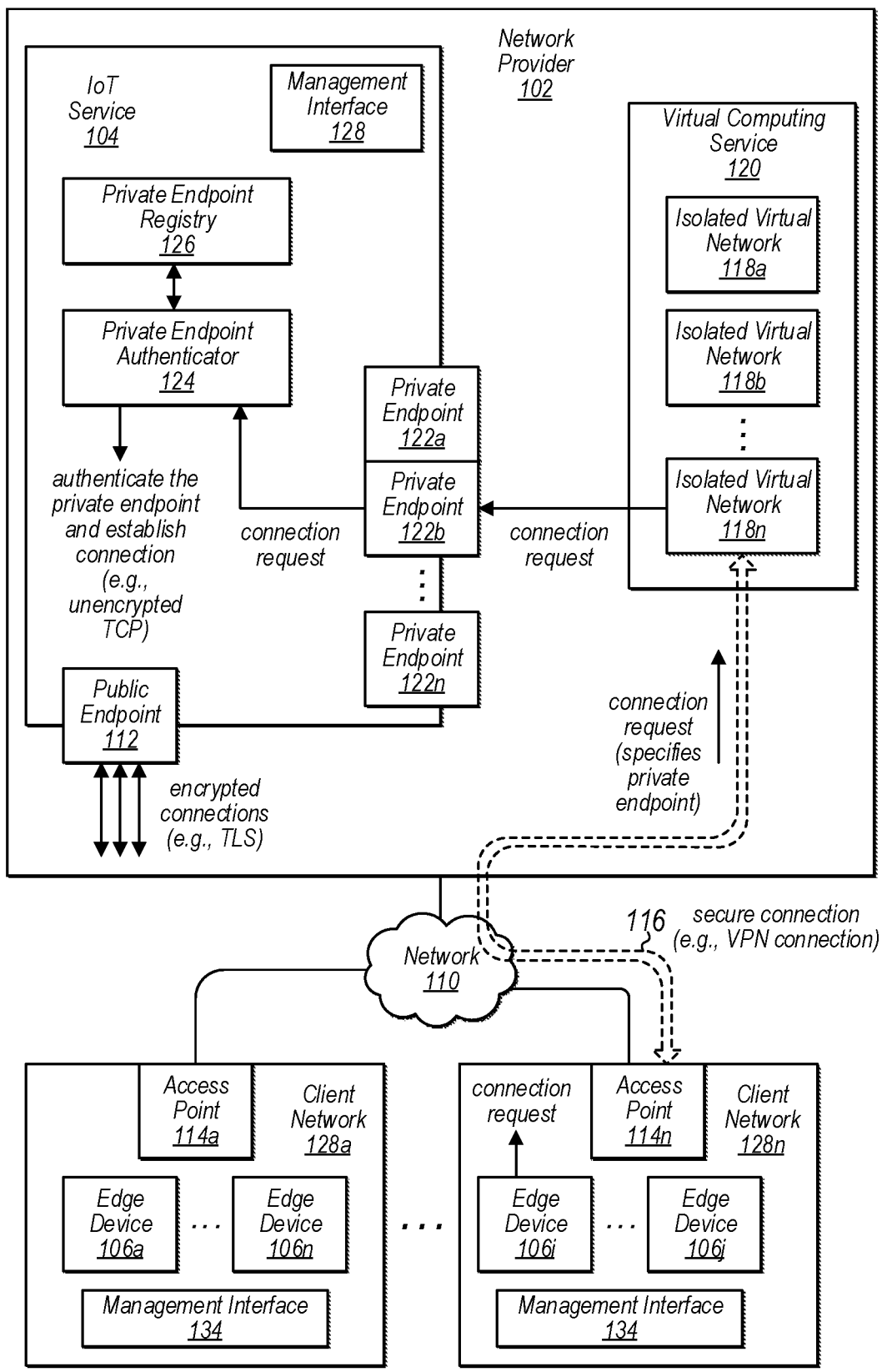
FIG. 1 is a logical block diagram illustrating a system for securing connections with edge devices that are incapable of encrypted transport layer connections, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to secure connections with IoT devices ("edge devices") that are incapable of encrypted transport layer connections, according to some embodiments. In embodiments, edge devices that are incapable of encrypted transport layer connections may establish a secure connection with a service (e.g., according to a transport control protocol (TCP)) without using an encrypted transport layer connection (e.g., TLS connection). For example, the service may authenticate a private endpoint that receives a connection request from a remote edge device and in response, establish a connection with the remote edge device. Therefore, embodiments may allow a much larger number of edge devices to access a service than would be possible if the service required encrypted transport layer connections for any access (e.g., end-to-end TLS connections).

In embodiments, a service of a provider network may expose a private endpoint (e.g., a private internet protocol network address (IP) of the service that may not be visible or accessible directly from the public Internet) into an isolated virtual network established on behalf of the client. In various embodiments, the service may also expose a public endpoint to the Internet (e.g., public IP) that allows any number of client edge devices to establish secure TLS connections. For example, the IoT service may receive a request at the public endpoint from a remote edge device (e.g., devices of the same client and/or other clients), authenticate the device based on an encrypted transport layer protocol (e.g., TLS), and in response, establish a secure connection with the device. In some embodiments, the IoT service may expose the public endpoint as a private endpoint into isolated virtual networks established on behalf of clients of the service/provider network. In embodiments, any number of different private endpoints may be established for different isolated virtual networks of different clients in this manner.

Embodiments may allow the service to receive a connection request from a remote edge device of a client by routing the connection request through the client's isolated virtual network to the private endpoint of the service. The service may determine that the connection request was received from the client's isolated virtual network and/or the service may identify the client associated with the remote edge device (e.g., based on a unique identifier for the client's isolated virtual network (or unique ID for the client) included in the request). In response, the service may authenticate the private endpoint and establish the connection with the remote edge device (e.g., an unencrypted connection according to a connection protocol, such as TCP). As described herein, by leveraging the client's own isolated virtual network and a private endpoint of a service, an edge device that is incapable of establishing an encrypted connection (e.g., a TLS connection) at the service's public endpoint may instead establish a connection to the service using the service's private endpoint.

In embodiments, a service may expose a private endpoint into any number of isolated virtual networks of different clients. The service may receive information from each new connection request, such as whether the connection request is from a private endpoint that is exposed into an isolated virtual network and which isolated virtual network the connection request is for. In some embodiments, the service can use this information to associate an incoming connection request with a client (or client account) that uses the isolated virtual network. By determining that the request is associated with a particular client (or client account) of the provider network/service provider, the service may authenticate the private endpoint (and/or the associated client/client account) and in response, accept unencrypted TCP connections from a remote edge device that transmitted the connection request.

In embodiments, the connection for the edge device may flow over a virtual private network (VPN) connection or other form of secured connection between the isolated virtual network and the remote network where the edge device is located. This may ensure that the connection is secure along the pathway from the client's remote network to the client's isolated virtual network and private endpoint.

In various embodiments, edge devices that are using Private Wireless Networks (PWNs) and that have their data sent to an isolated virtual network over a VPN connection can establish connections to a provider network's service without having to implement TLS or credentials such as pre-shared keys or client certificates. In some embodiments, an edge device may be identified as a unique device by using/providing a message queuing telemetry transport (MQTT) client identifier.

Embodiments described herein may remove the necessity to implement datagram transport layer security (DTLS) for edge devices to connect with the service. Smaller and/or simpler edge devices that may lack the ability to perform application layer encryption (but may rely on security and cryptographic capabilities of their data-link layer) may still have a way to establish connections, through the use of an isolated virtual network and a private endpoints of the service.

Figure 7:
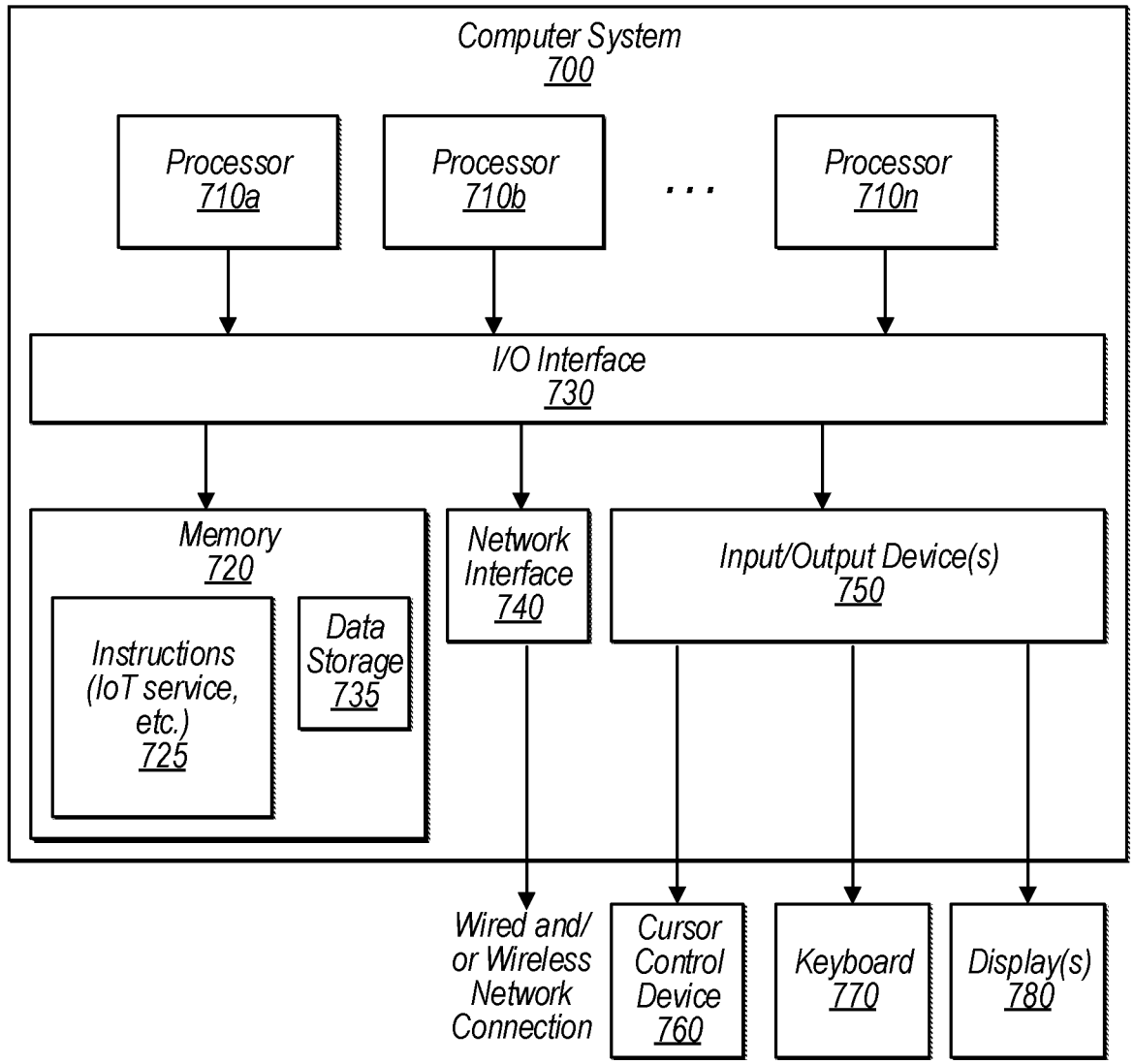
FIG. 7 is a block diagram illustrating an example computing system, according to some embodiments.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of systems for securing connections with edge devices that are incapable of encrypted transport layer connections. A number of different methods and techniques to secure connections with edge devices that are incapable of encrypted transport layer connections are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for securing connections with edge devices that are incapable of encrypted transport layer connections, according to some embodiments.

In the depicted embodiment, a provider network 102 of a service provider includes an IoT service 104 that establishes secure connections with any number of edge devices 106 that are incapable of encrypted transport layer connections. As shown, remote client networks 108 of any number of clients of the service provider may each include any number of edge devices that may not be capable of establishing encrypted transport layer connections such as TLS.

As shown, the different client networks 108 are remotely located from the provider network 102 (e.g., in a local network of the client, separate from a local network of the provider network). Devices within a given client network 108 may communicate with the provider network (or other remote networks) via a wide-area network 110 (e.g., the Internet). Different client networks may be controlled and/or owned by different clients of the provider network. In embodiments, each client network may include any number of different types of edge devices.

At least some client networks may have edge devices capable of establishing encrypted transport layer connections as well as edge devices that are not capable of such connections. In embodiments, some edge devices capable of establishing encrypted transport layer connections may be stand-alone devices (e.g., a mobile device such as a smart phone). A given encrypted transport layer-capable device may establish an encrypted transport layer connection with the IoT service 104 at a public endpoint 112 (e.g., public IP) via the wide-area network 110.

In the depicted embodiment, a given client network 108 (e.g., client network 108a or 108n) includes an access point 114 (e.g., access point 114a or 114n). The access point 114 may be a routing/computing device that receives data from and/or sends data to any of the edge devices 106. The access point 114 may forward data from any edge device to another destination (e.g., over the network 110 to the provider network 102) and forward data from another destination (e.g., received from the provider network 102 over the network 110) to any edge device. In embodiments, an access point may receive data from an edge device via a wireless or wired connection. For example, the access point and any of the edge devices may be part of a WiFi or a cellular network.

As shown, any data received at the access point from an edge device may be encrypted at the access point (e.g., into an IPsec tunnel or other form of secure VPN connection 116) and transferred over the wide area network 110 into an isolated virtual network of a client (e.g., isolated virtual network 118n). Similarly, encrypted data may be received at the access point from the isolated virtual network over the secure connection 116, where it may be decrypted and transmitted to the edge device. This may allow data to remain secure as it flows between the client's edge device and isolated virtual network. In some embodiments, the access point may perform decryption of data received from the edge devices or encryption of data before sending it to the edge device (e.g., in accordance with encryption used within the local wireless network).

As shown, the provider network may establish (e.g., using a virtual compute service (VCS) 120) any number of isolated virtual networks 118 on behalf of any number of different clients. As described in more detail below, an isolated virtual network 118 of a client may comprise a collection of computing and/or other resources in a logically isolated section of the provider network, over which the client is granted substantial control with respect to networking configuration.

In embodiments, IoT service 104 may expose a private endpoint 122 (private IP address) of the IoT service into an isolated virtual network of the client. In some embodiments, an administrator and/or the IoT service 104 may expose a private endpoint of the IoT service into an isolated virtual network in response to a request from the client (e.g., after determining the client has the necessary permissions).

In various embodiments, the provider network (e.g., the VCS and/or other components of the provider network) may provide/configure a private network pathway (or "private pathway") for traffic between the private endpoint and the isolated virtual network. In embodiments, private endpoints of the IoT service may also be exposed into isolated virtual networks established on behalf of any other number of clients (e.g., for concurrent use by edge devices of the other clients). Therefore, any aspects discussed herein for a particular client may apply to any other clients that may be using the IoT service in the same or similar way.

In the depicted embodiment, an edge device (e.g., the edge device 106i) may send a connection request to the IoT service and establish a connection with the IoT service, even though the edge device may be incapable of establishing encrypted transport layer connections (e.g., TLS connections) with the IoT service (e.g., using the public endpoint 112). In embodiments, since network traffic received from the private endpoint that is exposed to the client's isolated virtual network (e.g., isolated virtual network 118n) is attributable to the client, the IoT service may authenticate the private endpoint and establish a connection with the edge device if the IoT service determines/verifies that the connection request is received from the isolated virtual network of the client (e.g., after the request is routed through the isolated virtual network 118n to the private endpoint). The authentication of the private endpoint may be based at least on one or more requirements that had to be met in order for the private endpoint and/or the isolated virtual network to be established by the IoT service and/or the provider network. For example, the private endpoint 122b and/or the isolated virtual network 118n may have been previously established on behalf of the client in response to authentication and/or authorization of the client by the IoT service and/or the provider network (e.g., based at least on one or more security credentials maintained by the IoT service and/or the provider network on behalf of the client).

As shown, the IoT service may receive, at the private endpoint 122b from the edge device 106i (via the secure connection 116 and the isolated virtual network 118n), the connection request to connect to the IoT service 104. In embodiments, the connection request is received over the secure connection 116 between the provider network 102 and the client network 108, and the request is routed from the isolated virtual network 118n to the private endpoint 122b using the private pathway. The connection request may specify the private endpoint 122b (e.g., as the destination IP).

In embodiments, an edge device authenticator 124 may determine that the request was received from the isolated virtual network 118n of the client and in response, authenticate the private endpoint 122b and establish a connection with the edge device 106i. For example, the IoT service 104 may obtain information associated with the request (e.g., data included in the request) and identify the isolated virtual network 118n of the client as the isolated virtual network that sent the request to the IoT service 104 using the private endpoint 122b (e.g., as a forwarded request originating from the edge device 106a).

In the depicted embodiment, the edge device authenticator 124 may determine that the request was received from the isolated virtual network 118n of the client based at least on data stored by the IoT service 104 (e.g., at a private endpoint registry 126) that indicates the request was received from the isolated virtual network 118n of the client. For example, the private endpoint registry 126 may store a private endpoint identifier (e.g., the private IP address) of the private endpoint and/or a unique identifier of the isolated virtual network 118n.

The edge device authenticator 124 may obtain the private IP address and/or a unique identifier of the isolated virtual network 118n from the connection request and determine whether the private IP address and/or the unique identifier matches a corresponding private IP address and/or unique identifier stored in the private endpoint registry (e.g., stored when the private endpoint was initially established/configured for the client). If so, then the authenticator may determine that the request was received from the isolated virtual network 118n and in response, authenticate the private endpoint and establish a connection with the edge device 106i (e.g., an unencrypted TCP connection). In embodiments, authenticating the private endpoint may include verifying that the private endpoint is exposed into the client's isolated virtual network 118n, verifying the private endpoint was exposed into the client's isolated virtual network 118n based at least on authentication and/or authorization of the client, and/or verifying the identity of the client that the private endpoint or isolated virtual network 118n was established for.

As shown, the IoT service 104 may include a management interface 128 (e.g., application programming interface (API)) that may be used by a client to configure the IoT service for the client (e.g., for use with one or more edge devices 106 of the client. For example, a client (e.g., user or administer of the client) may use a management device 130 (e.g., via a graphical user interface (GUI) and/or a command line interface) to send a configuration request to the management interface 128 to establish a private endpoint of the IoT service for the isolated virtual network of the client.

In response to receiving the configuration request, the IoT service may determine whether the client has been assigned one or more permissions required for establishing a private endpoint of the IoT service for the isolated virtual network of the client (and/or the IoT service may authenticate the client based on security credentials of the client). If the IoT service determines that the client has been assigned the one or more required permissions, then the IoT service may identify a private IP address that is accessible from within the isolated virtual network of the client (e.g., from a range of IP addresses that are accessible), add the private IP address and/or a unique identifier of the isolated virtual network to the private endpoint registry, and/or expose the private endpoint into the isolated virtual network of the client as the private IP address of the IoT service. In embodiments, exposing the private endpoint into the isolated virtual network of the client may include performing various network path configurations by the IoT service in order to establish a private pathway for traffic between the private endpoint and the isolated virtual network.

Figure 2:
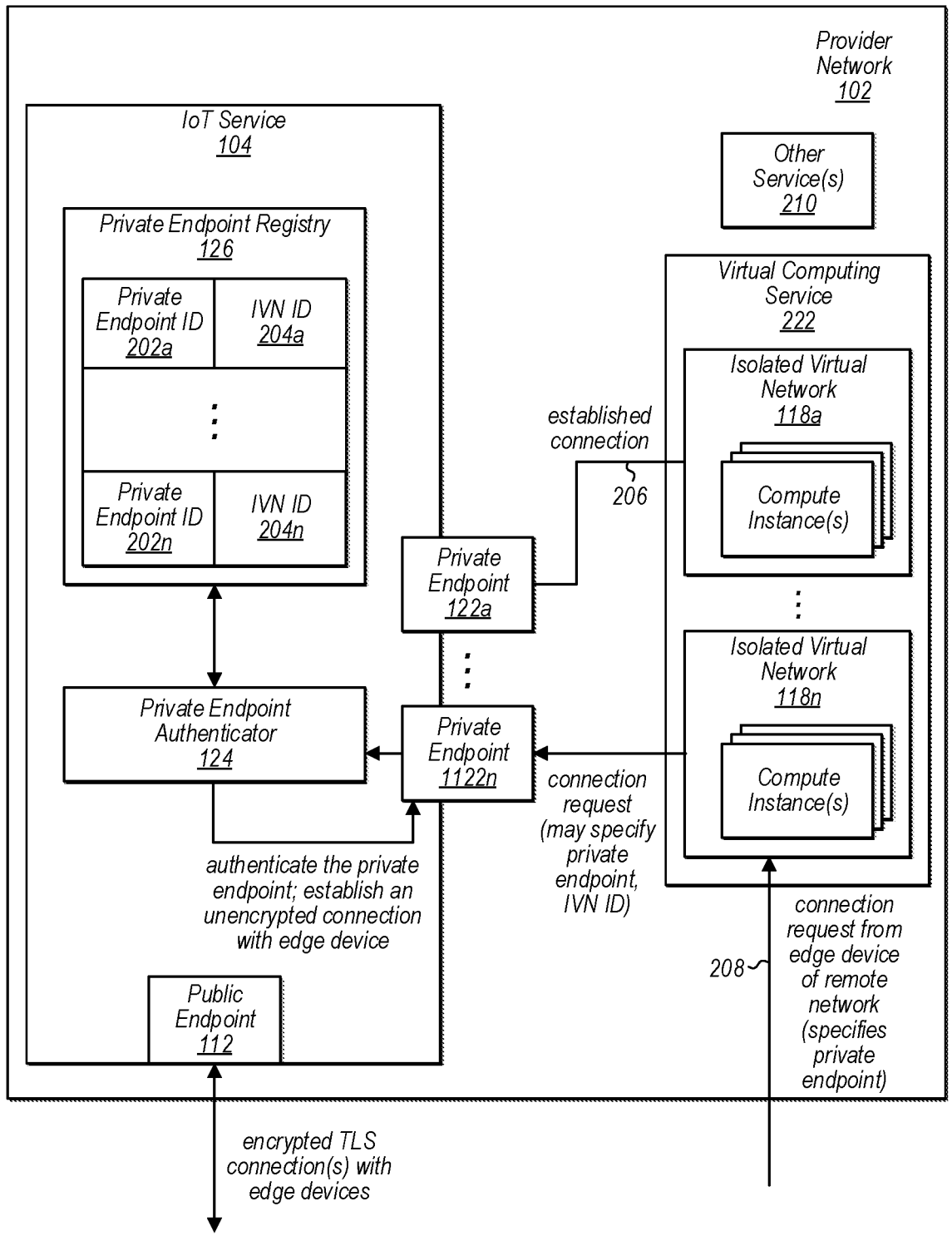
FIG. 2 is a logical block diagram illustrating a system for securing connections with edge devices that are incapable of encrypted transport layer connections, according to some embodiments.

FIG. 2 is a logical block diagram illustrating a system for securing connections with edge devices that are incapable of encrypted transport layer connections, according to some embodiments.

In the depicted embodiment, the private endpoint registry 126 of the IoT service 104 includes entries that each indicate a private endpoint ID 202 of a private endpoint that is established for an isolated virtual network of a client of the IoT service 104 and an IVN ID 204 of the particular isolated virtual network that the private endpoint is exposed into. For example, the first entry may indicate a particular private endpoint ID 202a of a private endpoint that is exposed into the isolated virtual network 118a and a unique identifier (IVN ID 204a) that uniquely identifies the isolated virtual network 118a. In embodiments, each entry may include any amount of other data associated with the endpoint (e.g., private IP address of the endpoint, associated client ID, etc.).

In some embodiments, the private endpoint registry may not store both private endpoint IDs and IVN IDs, but the IoT service may still determine that a connection request is received from a given isolated virtual network based on either the private endpoint ID or the IVN ID (e.g., provided by or associated with the connection request). In some embodiments, the private endpoint ID may be the private IP address of the private endpoint that is exposed to the isolated virtual network (or include the private IP address as part of the private endpoint ID). In other embodiments, a unique private endpoint ID may be generated/assigned to a given private endpoint for a particular client's isolated virtual network (e.g., during establishment/configuration of the endpoint for the isolated virtual network). In embodiments, a private endpoint ID may be a unique client ID/client account ID for a client, an IVN ID, or a combination of both. As shown, a connection 206 with a remote edge device has been established for one of the clients using the private endpoint 122a and the isolated virtual network 118a of the client.

The example embodiment also shows a connection request 208 from an edge device of another client that is routed to the private endpoint 122n through the isolated virtual network 118n. The edge device authenticator 124 may obtain, from the request, the private endpoint ID of the private endpoint 122n and/or the IVN ID of the isolated virtual network 118n. The edge device authenticator 124 may then determine that an entry exists in the private endpoint registry 126 that includes a matching private endpoint ID 202n and/or matching IVN ID 204n. In response, the edge device authenticator 124 may determine that the request was received from the isolated virtual network 118n of the client and authenticate the private endpoint and establish a connection.

In embodiments, the IoT service 104 or a remote edge device may use one or more other services 210 of the provider network (e.g., for data storage, data analysis, etc.). The IoT service may analyze and store data collected from the edge device and/or send commands to control functions of the edge device. However, at the IoT service may use some of the other services to perform at least some of these functions. In embodiments, one or more of the other services may authenticate private endpoints in the same or similar manner as described for the IoT service (e.g., to take advantage of different functionality offered by the different services).

In some embodiments, the private endpoint registry may store just one unique identifier for a given private endpoint (e.g., the private IP addresses of private endpoints or IVN IDs of isolated virtual networks a private endpoint is exposed into, but not both). Therefore, in embodiments, the edge device authenticator 124 may authenticate a private endpoint by obtaining the private endpoint ID (or the IVN ID) and determining that the private endpoint ID (or the IVN ID) matches an entry in the private endpoint registry. In some embodiments, any identifier that uniquely identifies the particular client and/or client's isolated virtual network may be stored in the private endpoint registry and used in the same way as described above to authenticate a given private endpoint.

In various embodiments, a unique identifier for the client (e.g., identifying the client's account at the provider network) may be used as the IVN ID. In embodiments, the IVN ID is a unique identifier that uniquely identifies an isolated virtual network with respect to any other isolated virtual networks, and may be the same as or different than the client ID for the client. In embodiments, the IVN ID of the isolated virtual network may be added to a connection request by the isolated virtual network of the client before it is routed to the exposed private endpoint of the IoT service.

In embodiments, the connection request (e.g., request 208) may include a device identifier (e.g., MQTT device identifier) of the remote edge device that submits the connection request. The IoT service may obtain the device identifier and add an entry for the remote edge device to a device registry that includes the device identifier. The entry may include other associated data, such as the private IP address for the device's connection (e.g., the IP address of the private endpoint), the IVN ID or the client ID.

As depicted, the provider network may enable clients to request the establishment of "isolated virtual networks" (IVNs) at the provider network (e.g., at the provider's data centers). An IVN (which may also be referred to in some environments as a "virtual private cloud" or IVN) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources such as various compute instances, manage the creation of subnets within the IVN and the configuration of route tables etc. for the IVN.

The term "private address" or "private IP address" may be used herein in the context of IVN networking configuration to refer to an address which represents an endpoint (e.g., a destination or source) of a private network pathway of the provider network. In embodiments, the term "private network pathway" or "private pathway" may be used herein to refer to a collection of network devices and links between provider network resources, such that the devices and links are owned and managed by the provider network operator and are not accessible from the public Internet. If two compute instances are each assigned a respective private IP address, e.g., within the same IVN or at respective IVNs, entities outside the provider network may typically be unaware of the mapping between the addresses and the instances, while internal networking components of the provider network (e.g., virtualization management components which act as intermediaries between the compute instances and hardware devices) may be able to route packets between the two instances. In contrast to private IP addresses, "public" IP addresses, which may also or instead be assigned to various resources of the provider network in at least some embodiments, may be accessible from the public Internet as a result of being directly or indirectly advertised on the public Internet via BGP (the Border Gateway Protocol) or other similar protocols.

In some embodiments, the use of private addresses may enable clients to protect their applications from potential attacks originating from the Internet. IVN support may be one of the features of a more general virtual computing service 120 (VCS) of a provider network in some embodiments. For example, the VCS may also support reservation or allocation of compute instances that are not part of an IVN, and for which the VCS (rather than the client to whom the instances are allocated) performs much or all of the networking configuration required.

Figure 3:
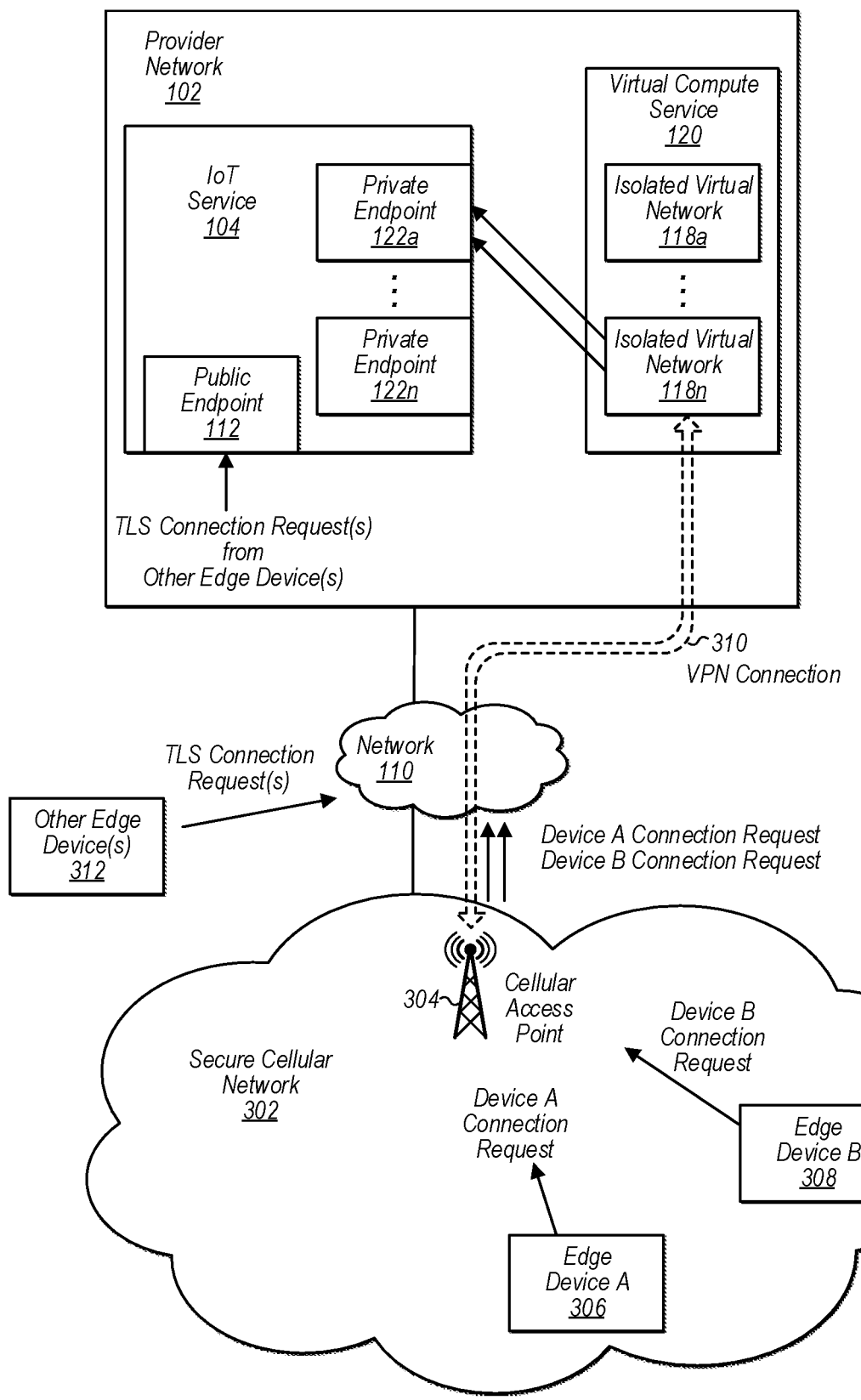
FIG. 3 is a logical block diagram illustrating a system for securing connections with edge devices of a cellular network that are incapable of encrypted transport layer connections, according to some embodiments.

FIG. 3 is a logical block diagram illustrating a system for securing connections with edge devices of a cellular network that are incapable of encrypted transport layer connections, according to some embodiments.

In the depicted embodiment, a secure cellular network 302 includes a cellular access point 304, edge device A 306, and edge device B 308. Edge device A and B belong to the same client. As shown, the edge devices may each send a connection request to the same private endpoint 122*a*, which is exposed by the IoT service to the client's isolated virtual network 118*n*.

In some embodiments, the connection requests may be sent to different private endpoints (using two different private IPs) exposed by the IoT service to the client's isolated virtual network 118*n*. In embodiments, one or more private endpoints may be exposed by the IoT service to isolated virtual networks of any number of different clients. For example, the private IP address for the private endpoint 122*a* may also be exposed to the isolated virtual network 118*n*. In such embodiments, the IoT service may identify/authenticate private endpoint based on an identifier unique to the client (e.g., an IVN ID or a client ID) that is stored in the private endpoint registry. In some embodiments, a particular private IP address may be exposed to only one client's isolated virtual network. In those cases, the IoT service may identify/authenticate a private endpoint based on the particular private IP address (and/or other unique identifier such as IVN ID or client ID).

In embodiments, the data link layer supports device specific encryption that is directly supported by the cellular modem of some or all of the edge devices. For example, data from edge device A may be encrypted by the modem and transferred over the cellular network to the access point 304, which is configured for edge device A, edge device B, or other devices that are part of the same secure cellular network (e.g., the same private wireless network). Data from the private wireless network that is received by the cellular access point 304 is encrypted (e.g., into an IPsec tunnel or other form of secure VPN connection 310) and transferred over the internet into the isolated virtual network 118*n* at the provider network and/or transferred over the internet into the isolated virtual network 118*n* at the provider network using a direct connection between the access point/cellular network and the isolated virtual network (e.g., a dedicated physical connection from the access point and/or the cellular network into the provider network, using fiber and/or cable, etc.). In some embodiments, the direct connection may provide a secure physical connection from the cellular network to the client's isolated private network and/or the provider network. As shown, any number of other edge devices 312 (e.g., in other client networks or stand-alone mobile devices) may connect to the IoT service via TLS connections.

Figure 4:
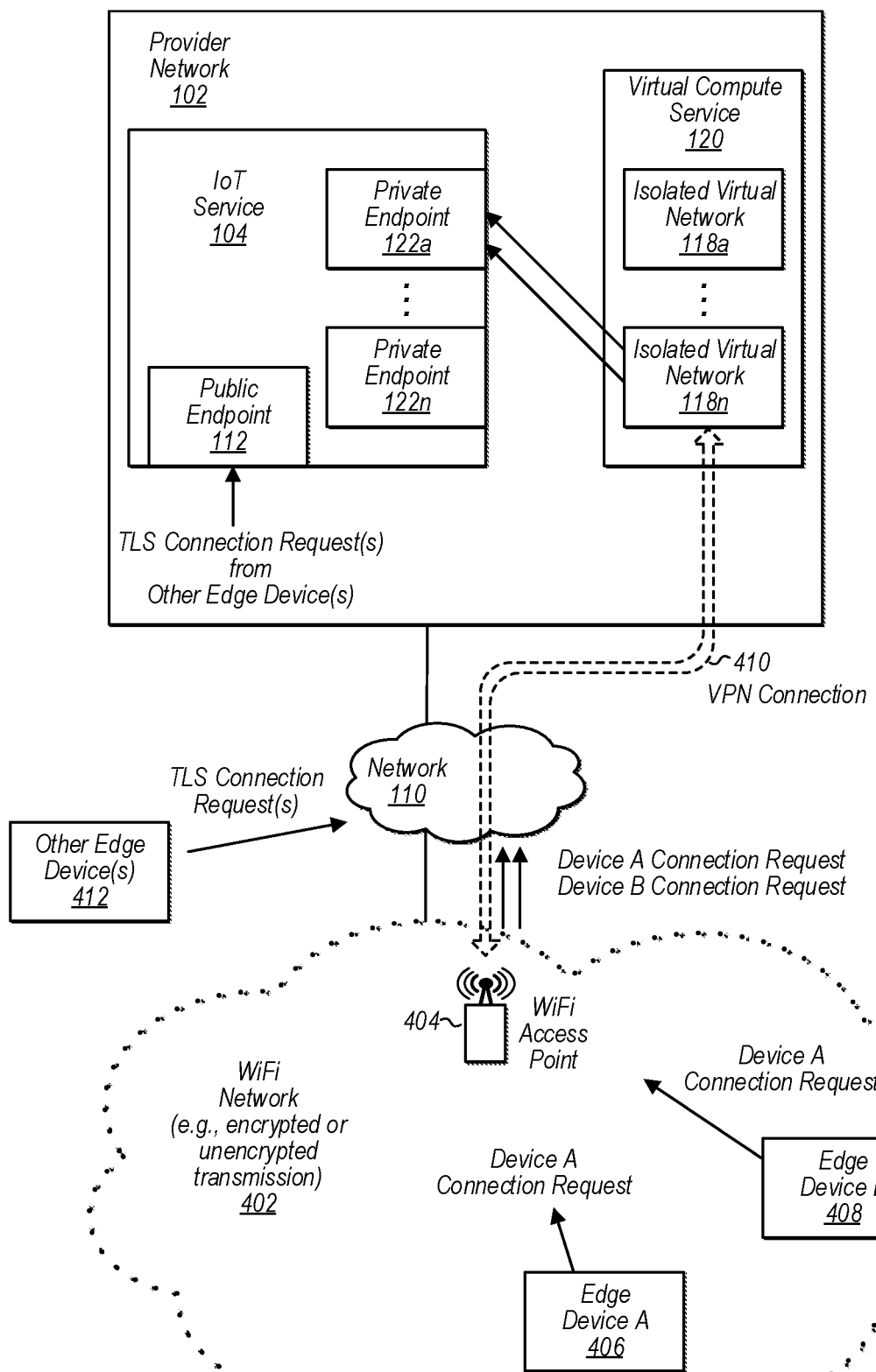
FIG. 4 is a logical block diagram illustrating a system for securing connections with edge devices of a WiFi network that are incapable of encrypted transport layer connections, according to some embodiments.

FIG. 4 is a logical block diagram illustrating a system for securing connections with edge devices of a WiFi network that are incapable of encrypted transport layer connections, according to some embodiments.

In the depicted embodiment, a wireless network environment (WiFi) network 402 includes a WiFi access point 404, edge device A 406, and edge device B 408. Edge device A and B belong to the same client. As shown, the edge devices may each send a connection request to the same private endpoint 122*a*, which is exposed by the IoT service to the client's isolated virtual network 118*n*.

As in FIG. 3, the connection requests may be sent to different private endpoints exposed the IoT service to the client's isolated virtual network 118*n*. In embodiments, one or more private endpoints may be exposed by the IoT service to isolated virtual networks of any number of different clients. For example, the private endpoint 122*a* may also be exposed to the isolated virtual network 118*a*. In such embodiments, the IoT service may identify/authenticate a private endpoint based on an identifier unique to the client (e.g., an IVN ID or a client ID).

In embodiments, the WiFi network 402 provides encryption (such as WPA2/3) of data transmission between devices and the WiFi access point. The WiFi access point may decrypt the data/traffic received from the edge devices (e.g., edge device A and B) and route the decrypted data/traffic via the VPN 410 over the internet into the isolated virtual network 118*n* at the provider network and/or transferred over the internet into the isolated virtual network 118*n* at the provider network using a direct connection between the access point/WiFi network and the isolated virtual network (e.g., a dedicated physical connection from the access point and/or the WiFi network into the provider network, using fiber and/or cable, etc.). In some embodiments, the direct connection may provide a secure physical connection from the client's on-premise local network to the client's isolated private network and/or the provider network. As shown, any number of other edge devices 312 (e.g., in other client networks or stand-alone mobile devices) may connect to the IoT service via TLS connections.

In some embodiments, the WiFi network 402 may not be secured through encryption, but may still be physically secured from wireless interception. Therefore, data transmission between edge devices and the WiFi access point may be unencrypted. However, due to the physical location of the edge devices and the WiFi access point, the WiFi network may be secure because other devices may be incapable of intercepting the data transmissions. For example, the edge devices and the WiFi access point may be located within an enclosed room or located far away from public areas such that data transmission cannot be received from outside devices.

Figure 5:
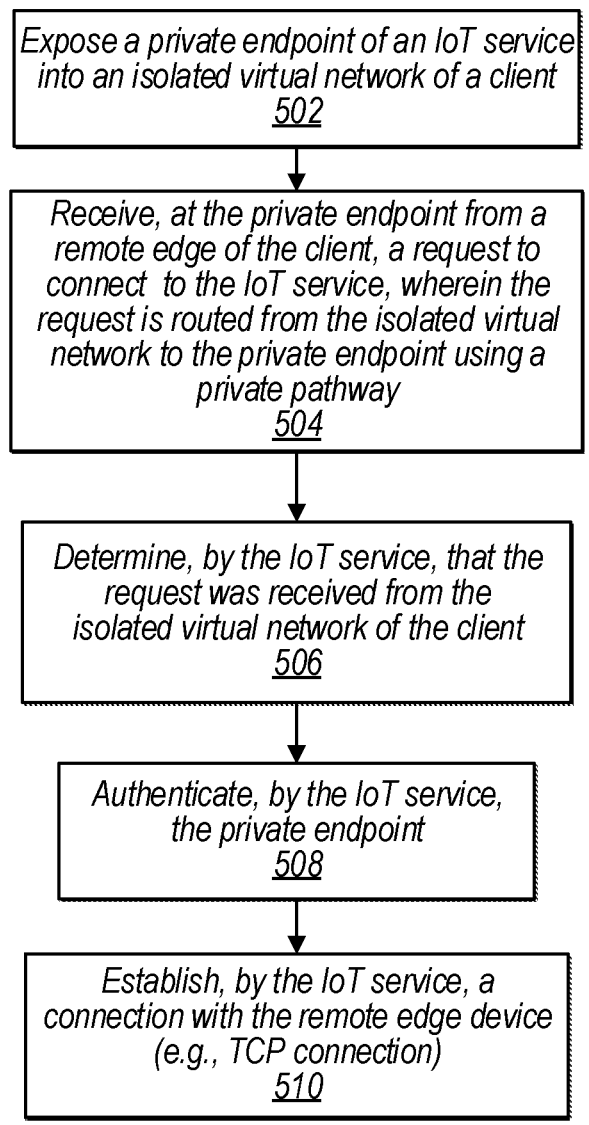
FIG. 5 is a high-level flowchart illustrating various methods and techniques to implement securing connections with edge devices that are incapable of encrypted transport layer connections, according to some embodiments.

FIG. 5 is a high-level flowchart illustrating various methods and techniques to implement securing connections with edge devices that are incapable of encrypted transport layer connections, according to some embodiments. These techniques, as well as the techniques discussed with regard to FIG. 6, may be implemented using components or systems as described above with regard to FIGS. 1-4, as well as other types of components or systems, and thus the following discussion is not intended to be limiting as to the other types of systems that may implement the described techniques. For example, the techniques may be implanted by an IoT service of a provider network and/or a local image-based predictor of a client network.

As indicated at block 502, an IoT service may expose a private endpoint of an IoT service into an isolated virtual network of a client. At block 504, the IoT service receives, at the private endpoint, a request to connect to the IoT service. As described herein, the request may be routed from the isolated virtual network to the private endpoint using the private pathway.

At block 506, the IoT service may determine that the request was received from the isolated virtual network of the client. At block 508, the IoT service may authenticate the private endpoint in response to determining that the request was received from the isolated virtual network of the client. At block 510, the IoT service may establish a connection with the remote edge device (e.g., in response to the authentication of the private endpoint and/or the client using the remote edge device).

Figure 6:
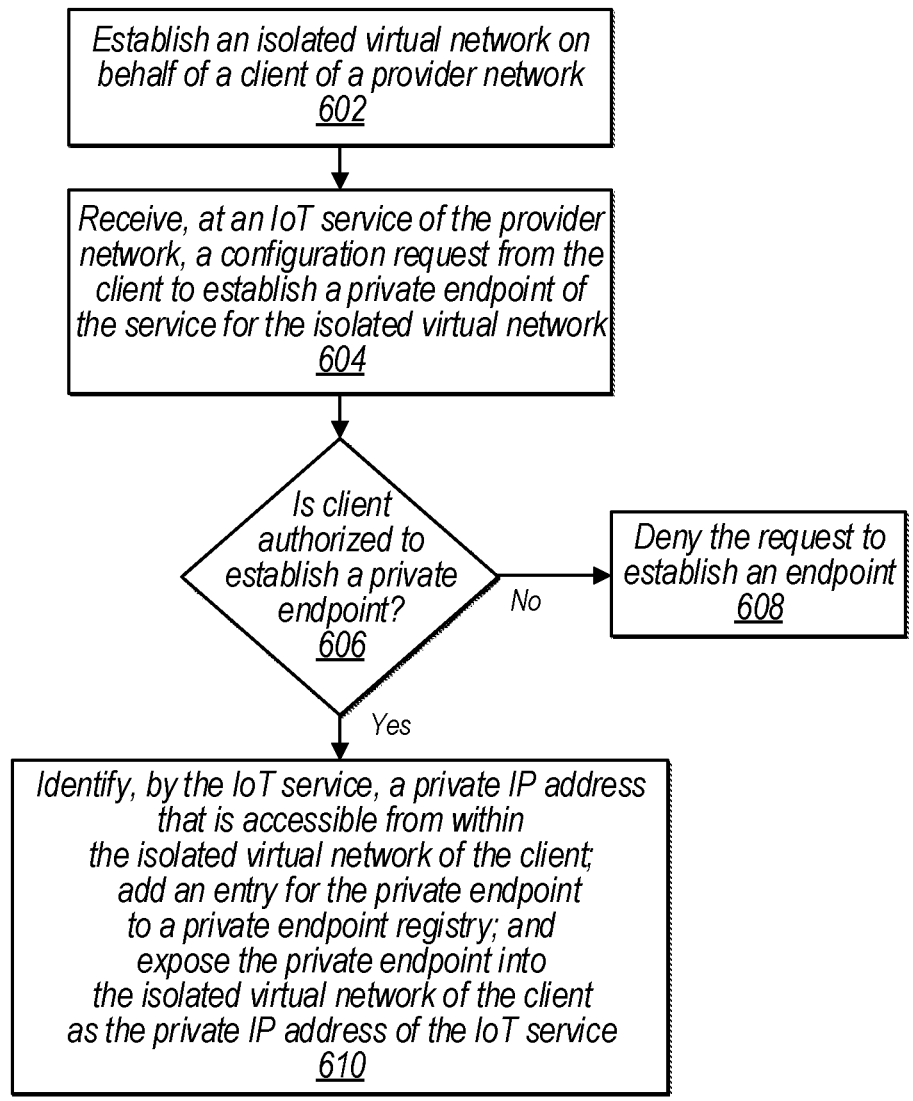
FIG. 6 is a high-level flowchart illustrating various methods and techniques to configure a private endpoint for securing connections with edge devices that are incapable of encrypted transport layer connections, according to some embodiments.

FIG. 6 is a high-level flowchart illustrating various methods and techniques to configure a private endpoint for securing connections with edge devices that are incapable of encrypted transport layer connections, according to some embodiments.

At block 602, The IoT service establishes an isolated virtual network on behalf of a client of the provider network. At block 604, the IoT service receives a configuration request from the client to establish a private endpoint of the IoT service for the isolated virtual network of the client.

At block 606, the IoT service determines whether the client is authorized to establish a private endpoint of the IoT service for the isolated virtual network of the client (e.g., based on whether one or more permissions for establishing a private endpoint are assigned to the client). If not, then at block 608, the request is denied. If the client is authorized, then at block 610, the IoT service identifies a private IP address that is accessible from within the isolated virtual network of the client, adds an entry for the private IP address to a private endpoint registry (e.g., an entry including the private IP address and/or the IVN ID), and/or exposes the private endpoint into the isolated virtual network of the client as the private IP address of the IoT service.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may implement the functionality described herein (e.g., the functionality of the IoT service, isolated virtual networks, devices, and other components that implement the techniques described herein). The various methods as illustrated in the figures and described herein represent example embodiments of methods. The order of any method may be changed, and various elements may be added, reordered, combined, omitted, modified, etc.

Embodiments to implement securing connections with edge devices that are incapable of encrypted transport layer connections as described herein may be executed on one or more computer systems, which may interact with various other systems or devices. One such computer system is illustrated by FIG. 9. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the IoT service, isolated virtual networks, devices, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., connection requests, private endpoint registry data, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
   a plurality of computing devices of a provider network configured to establish a respective isolated virtual network on behalf of individual clients of a plurality of clients of the provider network;

one or more processors; and one or more memories, wherein the one or more memories have stored thereon instructions, which when executed by the one or more processors, cause the one or more processors to implement an internet-of-things (IoT) service for the plurality of clients, wherein the IoT service is configured to, for a given client:

expose a private endpoint of the IoT service into one of the isolated virtual networks established on behalf of the client, wherein the provider network provides a private pathway for traffic between the private endpoint and the isolated virtual network, and wherein private endpoints of the IoT service are exposed into isolated virtual networks established on behalf of other clients;

receive, at the private endpoint from a remote edge device of the client, a request to connect to the IoT service, wherein the request is received over a secure connection between the provider network and a remote network, and wherein the request is routed from the isolated virtual network to the private endpoint using the private pathway;

determine that the request was received from the isolated virtual network of the client; and in response to the determination that the request was received from the isolated virtual network of the client:

authenticate the private endpoint; and establish a connection with the remote edge device.

2. The system as recited in claim 1, wherein the request to connect comprises a unique identifier of the isolated virtual network, and wherein to determine that the request was received from the isolated virtual network of the client, the IoT service is configured to:

obtain, from the request, the unique identifier of the isolated virtual network; and determine, based at least on the unique identifier, that the request was received from the isolated virtual network of the client.

3. The system as recited in claim 1, wherein the isolated virtual network of the client is configured to:

receive the request from an access point of a remote network over a virtual private network (VPN) connection or a direct connection between the access point and the isolated virtual network, wherein the remote network is a cellular network or a Wi-Fi network comprising the remote edge device.

4. The system as recited in claim 1, wherein the IoT service is configured to:

receive a configuration request from the client to establish a private endpoint of the IoT service for the isolated virtual network of the client;

authorize the request based at least on one or more permissions assigned to the client; and based at least on the authorization of the request:

identify a private IP address that is accessible from within the isolated virtual network of the client;

add an entry for the private IP address to a private endpoint registry; and expose the private endpoint into the isolated virtual network of the client as the private IP address of the IoT service.

5. The system as recited in claim 1, wherein the IoT service is further configured to:

expose a public endpoint to the Internet;

receive, at the public endpoint from another remote edge device of the client or another client, a request to connect to the IoT service;

authenticate the other remote edge device based on a transport layer security (TLS) protocol; and in response to the authentication of the other remote edge device, establish a secure TLS connection with the other remote edge device.

6. A method, comprising:

performing, by one or more computing devices of a provider network that implement an IoT service:

exposing a private endpoint of the IoT service into an isolated virtual network established by the provider network on behalf of a client;

receiving, at the private endpoint from a remote edge device of the client, a request to connect to the IoT service, wherein the request is received over a secure connection between the provider network and a remote network, and wherein the request is routed from the isolated virtual network to the private endpoint using a private pathway within the provider network;

determining that the request was received from the isolated virtual network of the client; and in response to determining that the request was received from the isolated virtual network of the client:

authenticating the private endpoint; and establishing a connection with the remote edge device.

7. The method as recited in claim 6, wherein the request to connect comprises an identifier of the isolated virtual network, and wherein determining that the request was received from the isolated virtual network of the client comprises:

obtaining, from the request, the identifier of the isolated virtual network; and determining, based at least on the identifier, that the request was received from the isolated virtual network of the client.

8. The method as recited in claim 6, further comprising:

obtaining, from the request, a device identifier for the remote edge device; and based at least on the device identifier, adding an entry for the remote edge device to a device registry for the client.

9. The method as recited in claim 6, wherein the request is received at the provider network from an access point of a remote network over a VPN connection between the access point and the provider network, wherein the remote network comprises the remote edge device.

10. The method as recited in claim 6, wherein the request is received at the provider network from an access point of a remote network over a direct connection between the access point and the provider network.

11. The method as recited in claim 6, further comprising:

expose a public endpoint to the Internet;

receive, at the public endpoint from other remote edge devices, requests to connect to the IoT service;

establish secure TLS connections with the other remote edge devices.

12. The method as recited in claim 6, wherein the remote edge device is incapable of establishing TLS connections.

13. The method as recited in claim 6, wherein establishing the connection with the remote edge device comprises:

establishing an unencrypted connection with the remote edge device according to a transmission control protocol (TCP).

14. The method as recited in claim 6, further comprising:
receiving a configuration request from the client to establish the private endpoint of the IoT service for the isolated virtual network of the client;
based at least on the request:
identify a private IP address that is accessible from within the isolated virtual network of the client;
add at least a unique identifier for the isolated virtual network to a private endpoint registry; and
expose the private endpoint into the isolated virtual network of the client as the private IP address of the IoT service.

15. One or more non-transitory computer-accessible storage media storing program instructions that when executed on or across one or more processors of a provider network cause the one or more processors to implement an IoT service to:
receive, at a private endpoint of the IoT service from a remote edge device of a client, a request to connect to the IoT service, wherein the private endpoint is exposed by the IoT service into an isolated virtual network established by the provider network on behalf of the client, and wherein the request is routed from the isolated virtual network to the private endpoint;
determine that the request was received from the isolated virtual network of the client; and
in response to the determination that the request was received from the isolated virtual network of the client:
authenticate the private endpoint; and
establish a connection with the remote edge device.

16. The one or more storage media as recited in claim 15, wherein the request to connect comprises an identifier of the isolated virtual network or the private endpoint, and wherein to determine that the request was received from the isolated virtual network of the client, the instructions when executed on or across one or more processors cause the one or more processors to:
obtain, from the request, the identifier of the isolated virtual network or the private endpoint; and
determine, based at least on the identifier, that the request was received from the isolated virtual network of the client.

17. The one or more storage media as recited in claim 16, wherein the endpoint identifier is stored by the IoT service in a private endpoint registry, and wherein the unique endpoint identifier comprises one or more of an identifier for the client or an identifier for the isolated virtual network of the client.

18. The one or more storage media as recited in claim 15, wherein traffic for the connection flows between the private endpoint and the isolated virtual network using a private pathway within the provider network.

19. The one or more storage media as recited in claim 15, wherein the request is received at the provider network from an access point of a remote network over a VPN connection or a direct connection, and wherein to establish the connection with the remote edge device, the instructions when executed on or across one or more processors cause the one or more processors to:
establish an unencrypted TCP connection with the remote edge device.

20. The one or more storage media as recited in claim 15, further comprising program instructions that when executed on or across the one or more processors further cause the one or more processors to:
expose a public endpoint of the IoT service to the Internet;
receive, at the public endpoint from one or more other remote edge devices of the client, a request to connect to the IoT service; and
establish one or more secure TLS connections with the one or more other remote edge devices of the client.

* * * * *